United States Patent
Smith et al.

(10) Patent No.: US 8,962,738 B2
(45) Date of Patent: Feb. 24, 2015

(54) STAIN-EATING COATINGS

(75) Inventors: Kim R. Smith, Woodbury, MN (US); Erik C. Olson, Savage, MN (US)

(73) Assignee: Ecolab USA Inc., St. Paul, MN (US)

( * ) Notice: Subject to any disclaimer, the term of this patent is extended or adjusted under 35 U.S.C. 154(b) by 298 days.

(21) Appl. No.: 13/221,553

(22) Filed: Aug. 30, 2011

(65) Prior Publication Data

US 2013/0052467 A1    Feb. 28, 2013

(51) Int. Cl.
| | |
|---|---|
| C08L 33/02 | (2006.01) |
| C08L 33/08 | (2006.01) |
| C08L 35/06 | (2006.01) |
| C08L 75/04 | (2006.01) |
| C08K 5/14 | (2006.01) |
| C09D 1/00 | (2006.01) |
| C08K 5/10 | (2006.01) |
| C08K 5/52 | (2006.01) |
| C09D 5/16 | (2006.01) |
| E04F 15/08 | (2006.01) |

(52) U.S. Cl.
CPC ... C08K 5/14 (2013.01); C09D 1/00 (2013.01); C08K 5/10 (2013.01); C08K 5/52 (2013.01); C09D 5/1618 (2013.01); E04F 15/08 (2013.01)
USPC ........... 524/500; 524/543; 524/556; 524/575; 524/804; 524/487; 524/274; 525/392

(58) Field of Classification Search
USPC ......... 524/543, 556, 575, 804, 274, 487, 500; 525/393
See application file for complete search history.

(56) References Cited

U.S. PATENT DOCUMENTS

| | | | | |
|---|---|---|---|---|
| 3,558,542 A * | 1/1971 | McDonald | ..................... | 524/271 |
| 4,009,150 A * | 2/1977 | Norling | ........................ | 526/141 |
| 4,131,585 A | 12/1978 | Feigin | .......................... | 260/29.6 |
| 5,137,952 A * | 8/1992 | Miller et al. | ................... | 524/140 |
| 5,250,609 A | 10/1993 | Kato et al. | ..................... | 524/560 |
| 5,281,674 A * | 1/1994 | Klaiber et al. | ................ | 525/281 |
| 5,522,580 A | 6/1996 | Varner, Jr. et al. | ............ | 252/102 |
| 5,773,372 A * | 6/1998 | Ikeyama et al. | ............... | 442/164 |
| 6,187,738 B1 * | 2/2001 | Micciche et al. | ............. | 510/278 |
| 6,309,471 B1 | 10/2001 | Smith et al. | ...................... | 134/28 |
| 6,559,213 B2 * | 5/2003 | Wesch | .......................... | 524/318 |
| 7,230,060 B2 | 6/2007 | Kohr et al. | .................. | 526/317.1 |
| 7,319,083 B2 | 1/2008 | Jin et al. | ........................ | 502/103 |
| 7,595,421 B2 * | 9/2009 | Grass et al. | .................... | 560/180 |
| 8,124,169 B2 * | 2/2012 | Ylitalo et al. | ..................... | 427/8 |
| 2007/0004846 A1 * | 1/2007 | Rogmann et al. | ............. | 524/501 |

FOREIGN PATENT DOCUMENTS

JP         73016967 B    *    5/1973

OTHER PUBLICATIONS http://infohouse.p2ric.org/ref/17/16643.pdf, Apr. 1996.*
JP 73016967 B, 1969, Derwent Ab.*
JP 73016967 B, English translation, May 1973.*

* cited by examiner

*Primary Examiner* — Satya Sastri
(74) *Attorney, Agent, or Firm* — Amy J. Hoffman

(57) ABSTRACT

A coating composition comprising a hardenable film-former and at least 0.5 weight percent of an oxidizing agent sufficient to decolorize a stain on the film-former is disclosed, wherein the oxidizing agent comprises hydrogen peroxide, hypochlorite, and organo-chlorine bleaches and will at least partially decolorize a plurality of stains when applied to the hardened coating, allowed to stand for one hour at room temperature, and evaluated by visual observation of the stain under average overhead fluorescent illumination. The oxidizing agent is not consumed as a catalyst or initiator to polymerize or otherwise cause a reaction in the floor coating before it is applied and before it has hardened. A composition of the invention may include from about 0.8 to about 5 weight percent oxidizing agent and the film-former forms a hardened film resistant to rinsing with tap water.

11 Claims, No Drawings

STAIN-EATING COATINGS

FIELD OF THE INVENTION

The invention relates to coatings for hardened surfaces. In particular, the invention relates to a coating or a finish capable of removing or eliminating stains. Compositions of the invention are useful in coating floors, counters, walls, or other surfaces that commonly suffer from staining. Restaurant, grocery, and hospital floors in particular benefit from compositions of the invention. Coatings of the invention are prepared by adding an oxidizing agent to a coating composition either at the time of blending of the coating or at the point of use of the coating. In preferred embodiments the coating is applied before a stain occurs thus rendering staining of the surface under the coating virtually impossible.

BACKGROUND OF THE INVENTION

Food and beverage stains are an ongoing problem on floor and counter finishes, particularly those in restaurants and grocery stores. Food products such as mustard, ketchup, coffee, and cola are commonly found in supermarkets where floor surfaces such as tile floors are employed. When they are spilled they can cause semi-permanent dark yellow, brown, or red stains to the coating itself or the underlying substrate. Workers in these situations are often unable to immediately clean up a spill that can result in discoloration of the floor finish. These stains can be very difficult to remove using traditional cleaning and laundering techniques, and are especially difficult to remove from floor tiles. For example, when mustard is spilled on vinyl composite tiles coated with a typical floor finish, both the finish and tiles may stain. Removal of such stains may require recoating the floor or even replacing the stained tiles. This can require substantial time and expenditure. While some polymers incorporated into a floor finish are synthesized using an oxidizer catalyst, the level of residual oxidizer present when that polymer is formulated into a floor finish composition is insufficient to decolorize stains on the coating.

While stains are eventually removable from the finish via specialty cleaners, these cleaners often do so at the expense of damage to the floor finish, making it necessary to recoat the floor. The time and expense of repairing the floor damage represents a substantial expenditure on the facility's part. Therefore, a need exists for a means of preventing or eliminating stains on floor finishes without causing damage to the finish.

One means of avoiding stains without film damage is to incorporate certain commercially available polymers such as Rohm & Haas's Rhoplex NTS-2923 into the finish. However, these polymers are much more expensive than conventional polyacrylates and require highly concentrated specialty strippers for their removal. Additionally, polymers such as this also tend to be difficult to formulate and are often incompatible with other polymers.

The inventors have surprisingly discovered that floor finish and/or sealer when combined with an oxidizing agent is able to decolorize stains such as coffee or mustard as they attempt to penetrate the coating film. The end result is partial or full decolorization of the stain. This permits cleaning of any material remaining on top of the film with mild cleaners, or even water, to afford a clean floor coating without film damage.

SUMMARY OF THE INVENTION

The present invention provides, in one aspect, a method for imparting stain resistance to a surface comprising applying to the surface a hardenable coating composition comprising an effective amount of an oxidizing agent sufficient to decolorize a stain.

In another aspect the invention provides a method for imparting to a surface resistance to oxidizable stains comprising applying to the surface a hardenable coating composition comprising an effective amount of an oxidizing agent having an oxidizing ability sufficient to decolorize an oxidizable stain.

In yet another aspect, the invention provides a floor coated with a floor finish comprising an effective amount of an oxidizing agent having an oxidizing potential sufficient to decolorize a stain on the floor finish.

The oxidizing agent reacts with the stain to change the stain coloration from a yellowish hue (e.g., yellow-white, yellow or brown) towards a lighter hue (e.g., pale yellow, white or transparent). This decolorization reaction takes place over a period of minutes, hours or days, and preferably can eventually cause the stain to disappear.

DETAILED DESCRIPTION OF PREFERRED EMBODIMENTS OF THE INVENTION

For the following defined terms, these definitions shall be applied, unless a different definition is given in the claims or elsewhere in this specification.

In this application, a "hardenable" coating composition is a composition that can be applied to a surface and then dried, cured, polymerized or otherwise converted to form a durable coating on the surface.

In this application, an "effective amount" of an oxidizing agent is an amount sufficient to at least partially decolorize a stain when applied to a test stain and allowed to stand for one hour at room temperature. A suitable test stain can be formed by applying prepared mustard to white vinyl composite tiles coated with a metal-catalyzed acrylic floor finish and wiping away excess mustard. Decolorization can be evaluated by visual observation of the stain under average overhead fluorescent illumination.

The term "substantially free" may refer to any component that the composition of the invention lacks or mostly lacks. When referring to "substantially free" it is intended that the component is not intentionally added to compositions of the invention. Use of the term "substantially free" of a component allows for trace amounts of that component to be included in compositions of the invention because they are present in another component. However, it is recognized that only trace or de minimus amounts of a component will be allowed when the composition is said to be "substantially free" of that component.

The term "stain" as used herein refers to any substance that would act to discolor a permeable or semi-permeable surface such as a polymeric floor coating, cement, granite, linoleum, ceramic tile and the like. "Stain" causing substances as used herein include but are not limited to coffee, tea, wine, cola, blood, beet juice, mustard, peach juice, chocolate, red food coloring and the like. A "stain" does not include oxidizing agents such as iodine which would impart a dark spot on a surface but may otherwise be referred to as an oxidizer. "Stain" causing substances include liquids and solids.

"Blending" as used herein refers to adding or mixing a component into a prepared floor finish. That is, blending does not refer to the step of synthesizing a polymer for a floor finish. Said otherwise, blending does not refer to polymerization of the floor finish.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant FIGURE.

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Weight percent, percent by weight, % by weight, and the like are synonyms that refer to the concentration of a substance as the weight of that substance divided by the weight of the composition and multiplied by 100.

Unless otherwise stated, all weight percentages provided herein reflect the active weight percent of each component. The weight percent of raw material as provided by the manufacturer is easily determined from the provided information by use of product data sheets as provided from the manufacturer.

As used herein the term, "consisting essentially of" in reference to a composition refers to the listed ingredients and does not include additional ingredients that, if present, would affect the hardening or coating ability of the floor coating composition. The term "consisting essentially of" may also refer to a component of the coating composition. For instance, a solvent package may consist essentially of two or more solvents and such solvent package would not include any other ingredients that would affect the effectiveness of that solvent package—either positively or negatively. As used herein the term "consisting essentially of" in reference to a method of preparing a self-bleaching flooring refers to the listed steps and does not include additional steps (or ingredients if a composition is included in the method) that, if present, would affect the method.

The invention can be used to prevent or decolorize stains caused by a wide variety of products. Typical stain-causing products include foodstuffs such as mustard, ketchup, coffee, cola, to name a few. The invention can be used to mask other problematic oxidizable stains that may be encountered, particularly those arising from the use of colored dyes in laboratories and other food soils in cafeterias, kitchens or supermarkets. The art and compositions of a floor finish and/or sealer is well-known to one skilled in the art. The oxidizing agent modification of this invention should have a sufficient redox potential as to be able to act as a chemical oxidizing agent relative to the stain. In particular, it should have a redox potential such that it would be able to oxidize the highly colored food and beverage stains of mustard, catsup, and red food coloring found in liquids such as Kool-Aid or Hawaiian Punch drinks Tables of redox potentials are well-known, an example of such is found in Lange's Handbook of Chemistry, 12th edition, McGraw Hill, pages 6-2 through 6-21 which is hereby incorporated by reference for all purposes.

A variety of oxidizing agents can be employed in the invention. Preferred oxidizing agents for this invention include but are not limited to hydrogen peroxide, hypochlorites, and organo-chlorine bleaches with hydrogen peroxide being most preferred. Preferred oxidizing agents have an electrochemical potential of less than +1.8, preferably less than +1.5, preferably less than +1.0. The invention contemplates that a single oxidizing agent or a combination of at least two oxidizing agents could be included in a formulation of the invention.

The oxidizing agent is included in an amount to make it effective in removing and or preventing staining of the floor finish or sealer. Preferred levels of oxidizing agent are between about 0.5 up to about 10 weight percent, from about 0.8 up to about 5 weight percent, from about 0.8 to about 2 weight percent. The oxidizing agent may be incorporated into the finish/sealer formulation at the point of its production for a one-part product or at its point of use for a two-part product. However, it is recognized that an embodiment includes adding the oxidizing agent at the point of use to ensure that the oxidizing agent is not deactivated during transport or storage due to incompatible pH or the general instability of the oxidizing agent in combination with the uncured finish or coating.

A variety of hardenable coating compositions can be employed in the invention. Such compositions can be made from a wide variety of film formers. Floor finish compositions are especially preferred coating compositions for use in the invention. Suitable commercially available floor finish compositions that can be modified by addition of the reducing agent include PADLOCK™, GEMSTAR LASER™ and TAJ MAHAL™ acrylic floor finishes from Ecolab Inc. located in St. Paul, Minn.; CORNERSTONE™ and TOPLINE™ acrylic floor finishes from 3M Company located in St. Paul, Minn. HIGH NOON™ acrylic finish from Butchers; CITATION™ acrylic finish from Buckeye International, Inc., COMPLETE SIGNATURE™, TECHNIQUE™ and VECTRA™ acrylic floor finishes from SC Johnson Professional Products; SPLENDOR™, DECADE 90™, PRIME SHINE™ ULTRA and PREMIER™ acrylic finishes and FORTRESS™ urethane acrylic finish from Minuteman, International, Inc.; UPPER LIMITS™ acrylic finish from Spartan Chemical Co.; blends of ROSHIELD™ acrylate coating with styrene maleic anhydride polymer; COURTMASTER II™ urethane floor finish from Ecolab Inc.; strippable floor coatings designated as "sealers" (e.g., OVER AND UNDER™ floor sealer, available from S. C. Johnson Professional Products and ACRYL-KOTE™ Seal and Finish and PREP Floor Seal from Minuteman, International, Inc.); strippable coatings based on polyvinylacetates and materials such as those described in U.S. Pat. Nos. 4,517,330 and 5,319,018 and the patents cited therein. The coating can also be a UV-curable coating and blends of coatings (e.g., up to 50 weight percent of a radiation curable coating with less than 50 weight percent of a non-radiation curable coating) can also be employed in the invention.

In an embodiment the oxidizing agent of the invention is not consumed as an initiator such as in initiating polymerization of monomeric components of the coating or sealant. As one may appreciate, it is desirable that the oxidizing agent does not act to initiate any reactions within the coating composition so that the oxidizing agent remains available to oxidize any stains that may deposit onto the coating or sealant once it has hardened. It is known to include catalysts to prepare polymerized compounds but that is not the invention at hand. The coating or sealant of the invention is comprised of components that do not rely upon the catalytic potential of the oxidizing agent in order for polymerization to occur. That is, coating compositions of the invention are suitable as floor coatings whether or not the oxidizing agent is added to the composition. That is, the coating composition will perform equally as well as a hardened floor coating or sealant whether or not the oxidizing agent is added to the coating composition. However, adding the oxidizing agent to the coating composition results in a hardened coating that is capable of reducing and/or eliminating stains placed or spilled on the hardened or cured coating.

The skilled artisan can likely appreciate that it would be counter-productive if the oxidizing agent of the invention were consumed by a polymerizing reaction once it was added to the composition. If the oxidizing agent of the invention were consumed as an initiator or catalyst it would not be available to act upon and remove later-deposited stains thereby rendering it useless for its intended purpose. If a floor coating is used for which the oxidizing agent can also act as an initiator or catalyst of a reaction such as a polymerization, an excess of the oxidizing agent is included such that enough oxidizing agent remains after the polymerization or other reaction is complete to remove or bleach stains from the floor coating once the coating is hardened.

| Component | Purpose | % by weight |
|---|---|---|
| Organic Solvents | Modify drying properties | 0.1-40 |
| Inorganic Solvent | Diluent/Carrier | 10-60 |
| Plasticizers |  | 0.1-20 |
| Polymer | Coating surface | 1-70 |
| Resin | Enhance strippability | 1-20 |
| Wax emulsion | Modifies buffability and coefficient of friction in coating | 1-20 |

An example composition of the present invention is the following:

An exemplary composition using the present invention is the following:

| Component | Parts (wt. %) | Parts (wt. percent) | Parts (wt. percent) | Purpose |
|---|---|---|---|---|
| Water | 10-60 | 35-50 | 44.8 | Diluent/Carrier |
| Diethylene glycol monoethyl ether | 0.1-20 | 1-5 | 3.0 | Organic Solvent |
| Dipropylene glycol methyl ether solvent | 0.1-20 | 0.7-4.7 | 2.7 | Organic Solvent |
| tributoxyethyl phosphate | 0.1-10 | 0.1-3.4 | 1.7 | Plasticizer |
| benzoate esters | 0.1-10 | 0.1-3.0 | 1.0 | plasticizer |
| polyacrylic emulsion | 1-70 | 32-45 | 38.1 | polymer |
| alkali soluble resin | 1-20 | 0.1-5.0 | 2.9 | Additive to improve strippability |
| polyethylene wax emulsion | 1-20 | 2.5-9.0 | 5.7 | Additive to modify buffability and coefficient of friction |

An oxidizing agent is added to the above-detailed composition in an amount from about 1.0 to about 10 weight percent, from about 1.5 to about 5 weight percent, and from about 1.5 to about 3 weight percent.

Optionally, a bleach activator may be incorporated into the above-described formulation. Nonlimiting examples of bleach activator include molecules with peroxidizable functionality such as amides, esters, nitriles, carboxylates, and transition metal compounds. The coating composition can contain a variety of adjuvants to alter the performance or properties of the coating composition before or after application to a substrate. Useful adjuvants include inorganic particles. Other useful adjuvants include surfactants, defoamers, waxes, indicators, colorants, optical brighteners, UV absorbers, light stabilizers and antioxidants. The types and amounts of such adjuvants will be apparent to those skilled in the art.

The process for preparing the floor finish/sealer without the addition of a oxidizing agent is well-known. The oxidizing agent may be incorporated into the coating composition at any stage in its manufacture. It may be added as a solid, powder, crystalline material, agglomerate, or solution. If necessary, solvents (glycol ethers, alcohols, water, etc.) or hydrotropes (sodium xylene sulfonate, potassium cumene sulfonate, octyldimethylamine oxide, monoethanolamine, diethanolamine, triethanolamine, ammonia and ammonium salts, etc.) may be added to assist with solubilization of the oxidizing agent.

The compositions of the invention can be applied to a variety of surfaces that ordinarily suffer from staining Such surfaces include floors (e.g., in hospitals, clinics, nursing homes, doctors' offices, dentists' offices, veterinarians' offices, grocery stores, restaurants, kitchens, and the like), non-floor architectural surfaces (e.g., walls, ceilings, countertops, cabinets and the like) and ambulance interiors. The compositions of the invention are recommended to coat and protect surfaces whenever potentially stain-causing products are used in the vicinity.

Once prepared, the coating may be applied to the surface through a variety of means including but not limited to flat and conventional mops, spraying, combined mechanical floor cleaning/coating, coating/burnishing equipment, or the like. Typically, the substrate should first be cleaned and any loose debris removed. One or more coats of the coating composition (e.g., one to five coats) are applied to the substrate, and allowed to dry. Each coat preferably will have a dry coating thickness of about 0.1 to about 100 micrometers, more preferably about 2.5 to about 20 micrometers. Preferably the overall coating thickness will be about 5 to about 150 micrometers, more preferably about 5 to about 40 micrometers. It is envisioned that once dried or cured the coating surface is renewable by buffing and/or burnishing, cleaning, or applying a floor finish restorer. It is believed that exposing an interior layer of the dried or cured coating will renew its oxidizing ability thereby renewing both the appearance and the bleaching ability of the coating.

The skilled artisan will recognize oxidizing materials are used as catalysts in existing floor coatings to convert monomers into polymers. However, the level of oxidant catalyst is typically at very low levels and clearly is at a level ineffective to remove or eliminate stains or the need for the present invention would not exist. If the oxidizing agents of the present invention are added to compositions requiring an initiator or a catalyst to polymerize the composition, the amount of oxidizing agent, if suitable as an initiator or catalyst far exceeds the amount necessary to catalyze any polymerization reaction. That is, a de minimus amount of oxidizing agent may be consumed to catalyze a polymerization reaction; however, a substantial amount of oxidizing agent remains active to remove stains after hardening of the composition. At least 0.5 weight percent, at least 1 weight percent, at least 1.5 weight percent, at least 2 weight percent, at least 3 weight percent, at least 4 weight percent, at least 5 weight percent, and at least 10 weight percent and at least 15 weight percent of the oxidizing agent remains in the composition after initiation of polymerization is complete.

The present invention incorporates or blends an oxidizing agent into a floor finish. The present invention does not include applying an oxidizing agent to a cured or hardened floor finish. This is known in the art as cleaning a floor finish. While the present invention may result in a cleaned floor finish, the oxidizing agent is an integral part of the floor finish or is blended into the floor finish before the finish is applied to the appropriate surface.

The compositions of the present invention can be prepared by a number of methods. Some convenient and satisfactory methods are disclosed in the following examples. The present invention can be better understood with reference to the following examples. These examples are intended to be representative of specific embodiments of the invention, and are not intended as limiting the scope of the invention.

EXAMPLES

Example 1

This example compares the bleaching ability on a coffee stain of an oxidant-containing finish of the invention as compared to a conventional finish.

A conventional floor finish commercially available from Ecolab as Gemstar Laser™, was compared with a variation of its formula containing 2 weight percent hydrogen peroxide. Gemstar Laser™ is a polyacrylate finish that is manufactured by using an oxidizer-initiated polymer. A vinyl composite floor tile was divided in half. One half of the tile floor was coated 4 times with Gemstar Laser™ finish (Control). The other half of the tile floor was coated 4 times with Gemstar Laser™ finish modified with 2 weight % hydrogen peroxide (invention composition). Once dry, each half of the finish-coated tile was treated with a solution of coffee/creamer/sugar which was allowed to dry on the tile overnight. The next day it was noted that the coffee stain on the invention portion (floor finish with 2 weight percent hydrogen peroxide) of the tile turned from dark brown to colorless. The entire tile was then rinsed with tap water. The invention treated section was free of color while the control section retained a light yellow tint. The Control demonstrates that the oxidizer used to initiate the polymerization of the polyacrylate in the floor finish is consumed by the initiation reaction and enough residual oxidizing agent is not present to decolorize or to oxidize the coffee stain. No film damage was noted for the invention treated section after rinsing.

This Example demonstrates that compositions of the invention are effective at preventing stains (as compared to conventional finish compositions) without any apparent film damage.

Example 2

In this Example, a composition of the invention was applied to an existing floor finish as a top coat.

A conventional floor finish commercially available from Ecolab as Gemstar Laser™, was compared with a variation on its formula containing 2 weight percent hydrogen peroxide. A vinyl composite floor tile was coated 3 times with Gemstar Laser™ coating. The tile was then divided into halves. One half was coated with Gemstar Laser™ (Control) and the other half coated with Gemstar Laser™ modified with peroxide per the invention. The resulting tile was treated overnight on each half with a solution of coffee/creamer/sugar. The next morning the tile was observed and it was noted that the stain on the invention-coated portion of the tile turned from dark brown to colorless. The entire tile was then rinsed with tap water. The invention-coated section was free of color while the control section had turned a light yellow color. This Example demonstrates that compositions of the invention are effective at preventing stains even when used to coat over conventional finish compositions.

Example 3

This Example demonstrates that compositions of the invention are suitable for eliminating red wine stains.

White vinyl coving was coated with either Laser™ floor finish or Laser™ floor finish containing 1 weight percent hydrogen peroxide per the invention. After drying, the tiles were treated with an aliquot of red wine that was allowed to dry in place. Within 1 hour, the invention finish had bleached the stain away while the unmodified control finish showed a distinct wine stain remaining.

Example 4

This Example demonstrates that organo-chlorine bleach is an effective oxidizing agent in compositions of the invention.

Laser™ floor finish was modified with 1 weight percent trichloro-s-triazinetrione as a source of chlorine bleach. The finish was applied to a floor tile and, after drying, several staining agents (mustard, coffee, red wine, grape juice, ketchup, mustard) were applied and allowed to dry. The dried stains were then lightly wiped with a wet towel leaving residual stains in place. Within 15 minutes, all stains except the mustard and wine were fully decolorized. Within two days, only a very slight residual stain of wine remained.

Example 5

This Example demonstrates that sodium hypochlorite is an effective oxidizing agent in compositions of the invention.

Laser™ floor finish was modified with 1 weight percent sodium hypochlorite bleach as a source of chlorine bleach. The finish was applied to a floor tile and, after drying, several staining agents (mustard, coffee, red wine, grape juice, ketchup, mustard) were applied and allowed to dry. The dried stains were then lightly wiped with a wet towel leaving residual stains in place. Within 15 minutes, all stains except the mustard and wine were fully decolorized. Within two days, only a very slight residual stain of wine remained.

Comparative Example

The invention has been described with reference to various specific and preferred embodiments and techniques. However, it should be understood that many variations and modifications may be made while remaining within the spirit and scope of the invention. Modifications of proportions, the elements, materials, and components used in the practice of the invention, and otherwise, which are particularly adapted to specific environments and operative requirements are envisioned by this application without departing from those principles. The appended claims are intended to cover and embrace any and all such modifications.

We claim:

1. A coating composition comprising an anionic hardenable film-former chosen from acrylate, urethane, acrylate with styrene copolymer, or combinations thereof, polyethylene wax, and at least 0.5 weight percent of an oxidizing agent sufficient to decolorize a stain on the film-former, wherein the oxidizing agent comprises hydrogen peroxide, hypochlorite, organic peroxides, organo-chlorine bleaches or a combination thereof and wherein the oxidizing agent is not consumed by initiating or catalyzing a reaction in the film-former composition, the hardened film-former decolorizes stains when contacted with staining solution for at least up to 48 hours, and wherein the composition is substantially free of surfactants.

2. A composition according to claim 1 wherein the oxidizing agent comprises hydrogen peroxide.

3. A composition according to claim 1 comprising about 0.8 to about 5 weight percent oxidizing agent.

4. A composition according to claim 1 comprising about 0.8 to about 2 weight percent oxidizing agent.

5. A coating composition according to claim 1 wherein the film-former forms a hardened film resistant to rinsing with tap water.

6. A hardenable coating composition, comprising an anionic polymer chosen from acrylate, urethane, acrylate with styrene copolymer, or combinations thereof, solvent, plasticizer, and at least 0.8 wt percent oxidizing agent wherein the oxidizing agent is not consumed by initiating or catalyzing a reaction in the hardenable coating composition, and the hardened coating composition decolorizes stains when contacted with staining solution for at least up to 48 hours.

7. The coating composition according to claim 6 wherein the polymer is comprised of polyacrylate or acrylate copolymer.

8. The coating composition according to claim 6 wherein the plasticizer is comprised of benzoate esters.

9. The coating composition according to claim 6 wherein the solvent is comprised of diethylene glycol monoethyl ether and dipropylene glycol methyl ether solvent.

10. The coating composition according to claim 6 further comprising water.

11. The coating composition according to claim 6 wherein the oxidizing agent is comprised of hydrogen peroxide.

\* \* \* \* \*